Patented Aug. 2, 1927.

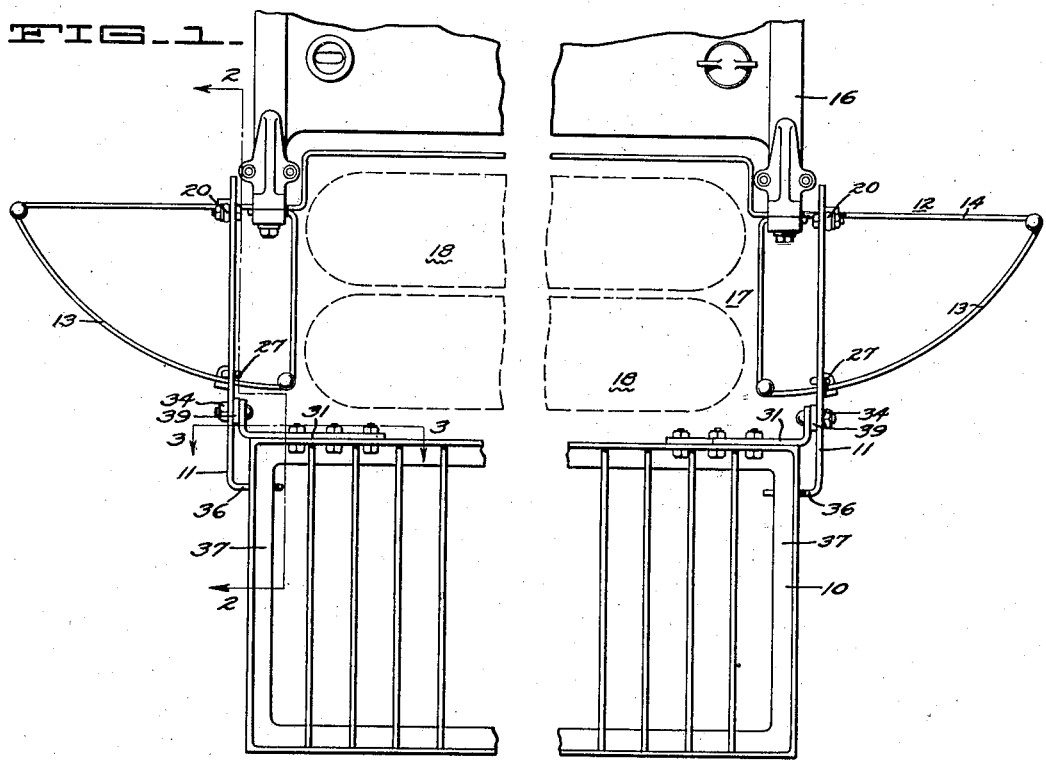

1,637,751

UNITED STATES PATENT OFFICE.

FRANK J. LAHER, OF OAKLAND, CALIFORNIA.

AUTOMOBILE LUGGAGE CARRIER.

Application filed August 31, 1926. Serial No. 132,726.

This invention relates generally to luggage carriers for attachment to automobiles. Luggage carriers have commonly been mounted adjacent the rear bumper of an automobile. In my copending application No. 115,799, entitled "Automobile luggage carrier" I have disclosed a novel form of universal mounting for a luggage rack which will readily adapt itself to any standard form of automobile bumper. However, when this mounting is employed with a wing or other type of rear bumper, the rack may interfere with the spare tire which is normally positioned intermediate of the bumper wings.

It is accordingly an object of this invention to devise a luggage rack mounting which may be incorporated with a rear bumper without interfering with the spare tire.

It is a further object of this invention to make use of extension bars in conjunction with suitable universal clamps whereby a luggage rack may be readily mounted upon any type of rear bumper without using more than one set of fittings.

Further objects of this invention will appear from the following description in which I have set forth the preferred embodiment of my invention. It is to be understood that the invention is to be accorded a range of equivalents consistent with the state of the prior art.

Referring to the drawings:

Figure 1 is a plan view of a device embodying the principles of this invention.

Fig. 2 is a cross section taken along the line 2—2 of Fig. 1.

Fig. 3 is a detail showing the adjustment of the hinge bars with respect to the luggage rack.

The invention comprises generally the use of extension bars for shifting the pivotal axis of the luggage rack rearwardly of the space normally occupied by the spare tire of an automobile. Thus there is shown a suitable luggage rack 10 which is preferably pivotally secured to a pair of extension bars 11. These bars are adapted to be mounted upon any standard type of rear bumper, the particular form of bumper shown being provided with side wings 12 which are constructed of impact members 13 and support members 14. Such bumpers are usually secured to the automobile frame 16 by suitable fittings so as to provide a space 17 for positioning a spare tire 18 between the side wings.

The fittings or clamping devices employed for mounting the extension bars upon the bumper are preferably such that they may be readily adjusted to fit different sizes and types of bumpers. One form of clamping means which has been found satisfactory comprises a threaded eyebolt 20 which extends slidably through a pair of clamping jaws 21. These clamping jaws are provided with suitable notches 22 whereby they may engage a support bar member 14 of the bumper or any other convenient bar which is secured to the automobile. The eye-bolt 20 is provided with nuts 23 whereby by adjusting the position of the nuts 23 this bolt may be raised or lowered to any desired position and the eye of the bolt may be twisted angularly to bring it in alinement with the extension bar 11. A bolt 24 or other suitable means serves to secure the eye of the bolt 20 to its associated extension bar 11, the extension bar being provided with a plurality of spaced apertures 26 whereby the bar may be adjusted forwardly or rearwardly without moving the clamping means.

The outer or rear portions of the extension bars preferably rest directly upon the impact members 13 of the bumper. To prevent rattling at this point there has been shown a tie rod 27 provided with a hook 28 at its upper end to engage an aperture in the bar 11, and provided with a suitable clamping jaw 29 adjacent its lower end. A nut 30 may be threaded upon the rod 27 so that the jaw 29 may be forced into engagement with an impact or support bar of the bumper.

The particular pivotal connection between the extension bars and the luggage rack has been shown as comprising a pair of hinge bars 31 which are preferably adjustably secured to the rack 10 as by means of bolts 32. For example, the hinge bars 31 may be constructed as shown in Fig. 3, the slotted apertures 33 serving to permit lateral adjustment of these members. The bars 31 are pivotally connected to the extension bars 11 by suitable means such as bolts 34 so that the rack may be swung upwardly in folded position about a horizontal axis. To serve as a stop for limiting downward movement of the rack the extension bars are provided with inturned portions 36 which are adapted to contact with the end rails 37 of the luggage rack. In order to have both the extension bars and the luggage rack normally in a horizontal plane the extension bars are provided with upstanding portions 39 to form the pivotal connection with the hinge bars 31, these upstanding portions serving to shift the plane of the pivotal axis above the upper edge of the extension bars 11.

With the device as described above it will be obvious that adjustments may be readily made to permit the device to be attached to any size or type of rear bumper. For example the extension bars 11 may be spaced farther apart by adjustment of the hinge bars 31 with respect to the luggage rack 10 or they may be adjusted forwardly or rearwardly of the bumper by inserting the bolt 24 in any one of the apertures 26. Furthermore, the extension bars may be adjusted to bring the luggage rack to horizontal position by raising or lowering the eye-bolt 20 in accordance with the nature of the impact and support bars of the particular bumper with which the rack is being used.

I claim:

1. A luggage carrier comprising a rack, a pair of extenson members, means for pivotally securing said rack to said extension members, and means for securing said members to an automobile bumper.

2. A luggage carrier adapted to be used in conjunction with an automobile having a rear bumper, said carrier comprising a rack, a pair of extension bars, vertically adjustable means for securing said bars to an automobile bumper, and means for pivotally securing said rack to said extension bars, said bars being adapted to rest upon the impact bars of the bumper.

3. A luggage carrier adapted to be used in conjunction with an automobile having a rear bumper, said carrier comprising a rack, a pair of extension bars, clamping means for securing said bars to the automobile bumper, said means permitting vertical and horizontal adjustment of the bars, and means for pivotally securing the rack to said bars.

4. A luggage carrier adapted to be used in conjunction with an automobile having a rear bumper, said carrier comprising a rack, a pair of extension bars, clamping means for securing said bars to the automobile bumper, said means permitting vertical and horizontal adjustment of the bars, and means for pivotally securing the rack to said bars, said bars including a stop member for limiting pivotal movement of the rack.

5. An automobile luggage carrier adapted to cooperate with an automobile bumper having impact and support members, comprising a rack, a pair of extension bars, means for pivotally securing said rack to said extension bars, and means for pivotally securing said extension bars to the support members of the bumper.

6. An automobile luggage carrier adapted to cooperate with an automobile bumper having impact and support members, comprising a rack, a pair of extension bars, means for pivotally securing said rack to said extension bars, clamping means for pivotally securing said extension bars to the support members of the automobile bumper, and means for securing said extension bars to the impact members of said bumper.

7. An automobile luggage carrier adapted to cooperate with an automobile bumper of the wing type having support and impact members, comprising a rack, a pair of extension bars, means for securing said rack to said extension bars, means for pivotally securing said extension bars to the support members of the bumper whereby the extension bars may rest upon the impact members of the bumper, said means being vertically adjustable to vary the plane of the extension bars.

8. An automobile luggage carrier adapted to cooperate with an automobile bumper of the wing type having support and impact members, comprising a rack, a pair of extension bars, means for securing said rack to said extension bars, means for securing each of said extension bars to the support member of the bumper whereby the extension bars may rest upon the impact members, said means each comprising a threaded eyebolt pivotally secured to its associated extension bar, nuts threaded upon said bolt, and a pair of jaws associated with the bolt and adapted to engage a bumper support member.

In testimony whereof, I have hereunto set my hand.

FRANK J. LAHER.